(12) United States Patent
Kaedei et al.

(10) Patent No.: US 8,428,808 B2
(45) Date of Patent: Apr. 23, 2013

(54) ENGINE FUEL DIAGNOSIS DEVICE AND CONTROL APPARATUS FOR AUTOMATIC TRANSMISSION HAVING THE DEVICE

(75) Inventors: Tomohiro Kaedei, Toyota (JP); Mitsuhiro Fukao, Toyota (JP); Shinji Kato, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 224 days.

(21) Appl. No.: 12/678,098

(22) PCT Filed: Jul. 22, 2009

(86) PCT No.: PCT/JP2009/063449
§ 371 (c)(1),
(2), (4) Date: Mar. 12, 2010

(87) PCT Pub. No.: WO2010/013722
PCT Pub. Date: Feb. 4, 2010

(65) Prior Publication Data
US 2010/0250048 A1 Sep. 30, 2010

(30) Foreign Application Priority Data
Aug. 1, 2008 (JP) ................................. 2008-199926

(51) Int. Cl.
*F02D 19/08* (2006.01)
(52) U.S. Cl.
USPC ........................................................ 701/29.1
(58) Field of Classification Search .................... 701/29, 701/99, 103, 104, 105, 106, 29.1; 123/406.3, 123/406.31, 406.32, 406.33, 575; 73/35.02
See application file for complete search history.

(56) References Cited

U.S. PATENT DOCUMENTS

| 3,713,351 | A | * | 1/1973 | Sakakibara et al. ............ 477/61 |
| 4,015,572 | A | * | 4/1977 | Leshner et al. ............... 123/457 |
| 4,471,437 | A | * | 9/1984 | Yoshino et al. ................ 701/65 |
| 5,010,490 | A | * | 4/1991 | Naito et al. .................... 701/95 |

(Continued)

FOREIGN PATENT DOCUMENTS

| CN | 1696484 A | 11/2005 |
| CN | 1973123 A | 5/2007 |

(Continued)

OTHER PUBLICATIONS

JPO machine translation of JP 09-222045.*

*Primary Examiner* — Mary Cheung
*Assistant Examiner* — David Testardi
(74) *Attorney, Agent, or Firm* — Sughrue Mion, PLLC

(57) ABSTRACT

An engine fuel diagnosis device is disclosed that diagnoses whether an unexpected fuel is being used in an internal combustion engine. The fuel diagnosis device includes an inclination detecting section, a first estimating section, an acceleration detecting section, and a diagnosing section. The first estimating section computes a first estimated acceleration, which is a vehicle acceleration obtained when fuel injection is executed in the internal combustion engine while the vehicle is traveling uphill or downhill, based on an engine power, which is estimated based on the engine operation state on the assumption that a previously expected fuel is being used, and the inclination detected by the inclination detecting section. The diagnosing section computes a first deviation degree indicating the degree of deviation between the first estimated acceleration and the actual acceleration detected when the first estimated acceleration is computed. The diagnosing section diagnoses the usage state of the unexpected fuel based on the first deviation degree.

4 Claims, 5 Drawing Sheets

U.S. PATENT DOCUMENTS

| | | | |
|---|---|---|---|
| 5,184,527 A | 2/1993 | Nakamura | |
| 5,317,937 A * | 6/1994 | Yoshizawa et al. | 477/120 |
| 5,443,595 A * | 8/1995 | Shimei et al. | 477/155 |
| 6,073,611 A * | 6/2000 | Ohuchi et al. | 123/435 |
| 6,295,808 B1 * | 10/2001 | Griffin et al. | 60/776 |
| 6,874,360 B1 * | 4/2005 | Kar et al. | 73/115.01 |
| 6,947,830 B1 * | 9/2005 | Froloff et al. | 701/111 |
| 7,117,862 B2 * | 10/2006 | May | 123/674 |
| 7,189,185 B2 * | 3/2007 | Schlecht | 477/54 |
| 7,359,784 B2 * | 4/2008 | Murasugi et al. | 701/51 |
| 7,653,474 B2 * | 1/2010 | Cawthorne et al. | 701/99 |
| 7,720,592 B2 * | 5/2010 | Leone et al. | 701/103 |
| 2005/0061066 A1 | 3/2005 | Kar et al. | |
| 2006/0154784 A1 | 7/2006 | Surnilla et al. | |

FOREIGN PATENT DOCUMENTS

| | | | |
|---|---|---|---|
| JP | 63-121537 A | | 5/1988 |
| JP | 63-180524 A | | 7/1988 |
| JP | 04-316759 A | | 11/1992 |
| JP | 09222045 A | * | 8/1997 |
| JP | 2001336619 A | * | 12/2001 |
| JP | 2005-105822 A | | 4/2005 |
| JP | 2007-137321 A | | 6/2007 |
| JP | 2008-280893 A | | 11/2008 |
| JP | 2009-150305 A | | 7/2009 |
| WO | 02/086302 A1 | | 10/2002 |
| WO | 2008/090998 A1 | | 7/2008 |

* cited by examiner

ENGINE FUEL DIAGNOSIS DEVICE AND CONTROL APPARATUS FOR AUTOMATIC TRANSMISSION HAVING THE DEVICE

CROSS REFERENCE TO RELATED APPLICATION

This application is a National Stage of International Application No. PCT/JP2009/063449 filed Jul. 22, 2009, claiming priority based on Japanese Patent Application No. 2008-199926, filed Aug. 1, 2008, the contents of all of which are incorporated herein by reference in their entirety.

FIELD OF THE INVENTION

The present invention relates to an engine fuel diagnosis device and a control apparatus for an automatic transmission having the device.

BACKGROUND OF THE INVENTION

Since the combustion state of an air-fuel mixture in an internal combustion engine changes depending on the components of the fuel used, the power of the engine also varies depending on the fuel components.

For example, the power of an internal combustion engine that can use a blended fuel obtained by blending a gasoline fuel and an alcohol fuel changes in accordance with the alcohol concentration in the blended fuel. The control apparatus for an internal combustion engine disclosed in Japanese Laid-Open Patent Publication No. 2007-137321 thus estimates the alcohol concentration in a blended fuel, and changes the control state of the engine, such as the fuel injection amount and the ignition timing in accordance with the estimated alcohol concentration.

The alcohol concentration of a blended fuel used in the above internal combustion engine varies in a range from 0% to 100%. Accordingly, on the assumption that a blended fuel containing alcohol fuel of the above concentration range will be used, an estimation program for estimating the alcohol concentration in a blended fuel and a control program for changing the control state of the engine in accordance with the alcohol concentration is developed. Therefore, as long as the alcohol concentration is within an expected range, the engine can be properly controlled in accordance with the alcohol concentration.

Changes in the fuel components include not only changes in the alcohol concentration in a blended fuel, but also changes in the octane number and deterioration of the fuel. In the case where changes in the fuel components will certainly be within expected ranges, programs for detecting the fuel components in accordance with the expected ranges are prepared, so that the influence of compositional differences of fuel on the engine power can be determined.

The above illustrated configuration can be used only in the case where the fuel used in the internal combustion engine is predictable, and the programs are previously given compatible values that correspond to the use of fuels in the expected ranges. However, an unexpected fuel, for example, a newly developed fuel that did not exist when the programs were developed or a fuel that has deteriorated further than when the programs were developed, may possibly be used. In such cases, the use of an unknown fuel cannot be detected. Hence, the influence of compositional differences of fuel on the engine power cannot be accurately detected.

Such insufficient detection of the influence of compositional differences of fuel on the engine power causes the following drawbacks.

For example, in an automatic transmission for an internal combustion engine, hydraulic pressure supplied to hydraulically actuated portions such as the clutch and brake, which are operated when the gear is shifted, is adjusted in accordance with the engine power. More specifically, the input torque transmitted from the engine to the transmission is computed based on the engine power, and the hydraulic pressure supplied to the hydraulically actuated portions is adjusted based on the computed input torque. When the input torque is great, the hydraulic pressure supplied to the hydraulically actuated portions is raised to prevent the hydraulically actuated portions from skidding. When the input torque is small, the hydraulic pressure supplied to the hydraulically actuated portions is lowered so that excessive hydraulic pressure is not supplied. Such hydraulic pressure control improves the fuel consumption and the durability of the automatic transmission. If the influence of compositional differences of fuel on the engine power cannot be accurately detected when the hydraulic pressure control is executed, the accuracy of the estimation of the input torque is lowered. This can lead to excessive or insufficient hydraulic pressure supplied to the hydraulically actuated portions.

DISCLOSURE OF THE INVENTION

Accordingly, it is an objective of the present invention to provide an engine fuel diagnosis device that diagnoses the usage state of an unexpected fuel, and a control apparatus for an automatic transmission that properly controls hydraulic pressure in hydraulically actuated portions even if an unexpected fuel is being used.

To achieve the foregoing and other objectives, and in accordance of a first aspect of the present invention, an engine fuel diagnosis device for diagnosing whether an unexpected fuel is being used in an internal combustion engine is provided. The device includes an inclination detection section, a first estimating section, an acceleration detecting section, and a diagnosing section. When a vehicle on which the internal combustion engine is mounted is traveling uphill or downhill, the inclination detecting section detects the inclination of the road surface. The first estimating section computes a first estimated acceleration, which is a vehicle acceleration obtained when fuel injection is executed in the internal combustion engine while the vehicle is traveling uphill or downhill, based on an engine power, which is estimated based on the engine operation state on the assumption that a previously expected fuel is being used, and the inclination detected by the inclination detecting section. The acceleration detecting section detects an actual acceleration, which is the actual acceleration of the vehicle. The diagnosing section computes a first deviation degree indicating the degree of deviation between the first estimated acceleration and the actual acceleration detected when the first estimated acceleration is computed, and diagnoses the usage state of the unexpected fuel based on the first deviation degree.

In accordance with a second aspect of the present invention, a control apparatus for an automatic transmission having a hydraulically actuated portion is provided. The control apparatus estimates an input torque transmitted from an internal combustion engine mounted on a vehicle to the automatic transmission, and adjusts hydraulic pressure supplied to the hydraulically actuated portion based on the estimated input torque. The control apparatus includes the fuel diagnosis device according to the first aspect of the present invention, and corrects the input torque based on the first deviation degree.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An engine fuel diagnosis device for one embodiment in accordance with the present invention will now be described with reference to FIGS. 1 to 5. An engine fuel diagnosis device of the present embodiment is employed in a control apparatus 200 of an automatic transmission 30 mounted on a vehicle 100.

Figure 1:
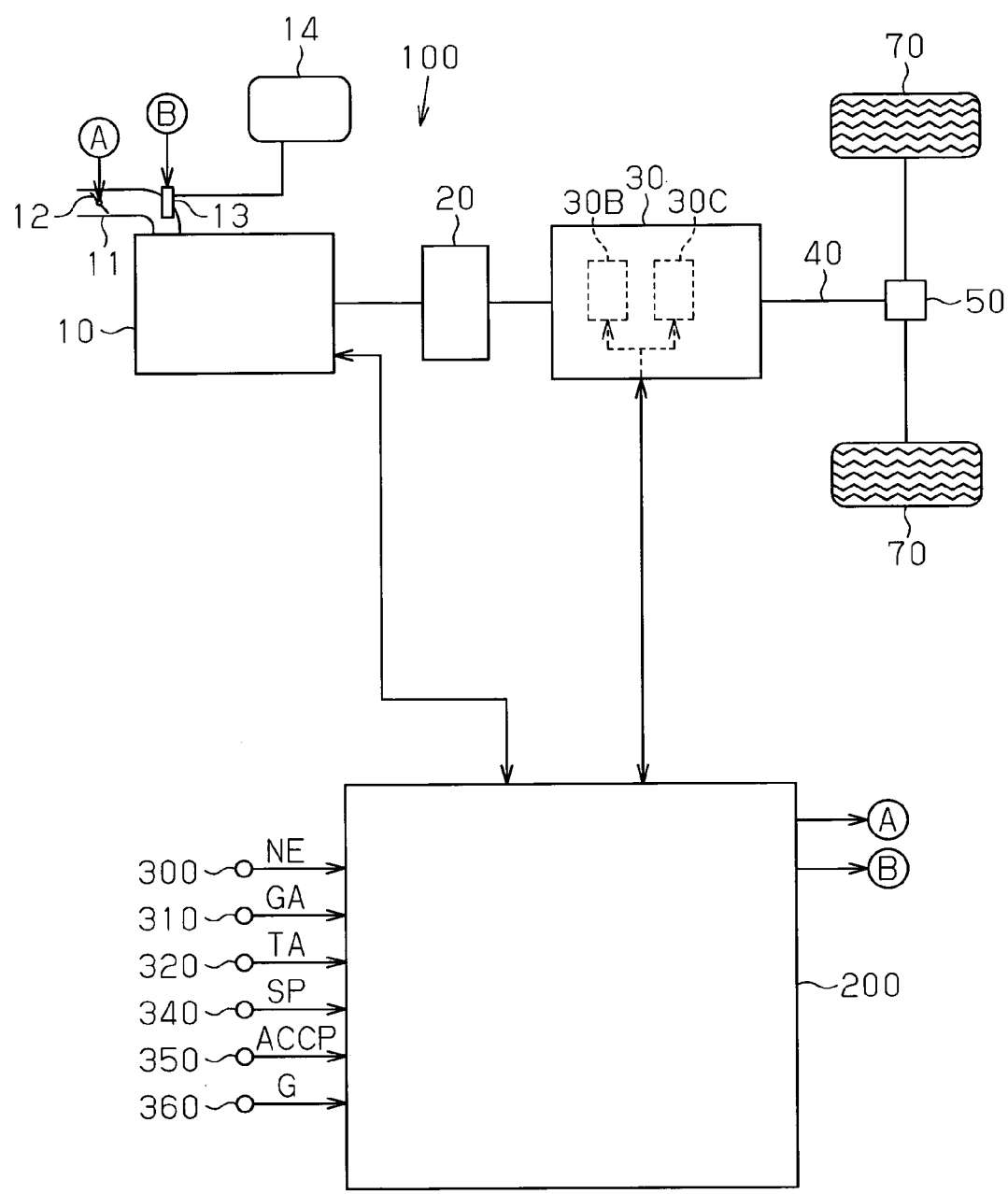
FIG. 1 is a diagram showing the structure of a vehicle equipped with a control apparatus for an automatic transmission of one embodiment in accordance with the present invention.

FIG. 1 shows the overall structure of the vehicle 100 equipped with the control apparatus 200 for the automatic transmission 30 in the present embodiment.

As shown in FIG. 1, the engine 10 is mounted on the vehicle 100. A throttle valve 12 for adjusting the intake air amount is provided in an intake passage 11 of the engine 10. Fuel is supplied to a fuel injection valve 13 from a fuel tank 14 through a fuel supply system in the engine 10. An amount of fuel corresponding to the intake air amount from the fuel injection valve 13 is injected into the intake passage 11, so that the engine power is controlled.

The crankshaft of the engine 10 is connected to an input shaft of a torque converter 20, which is a liquid coupling. The output shaft of the torque converter 20 is connected to the input shaft of the automatic transmission 30 having multiple gears. The automatic transmission 30 has hydraulically actuated portions, that is, a brake 30B and a clutch 30C. The gear of the automatic transmission 30 is shifted through control of hydraulic pressure supplied to the hydraulically actuated portions. The output shaft of the automatic transmission 30 is connected to a propeller shaft 40, and the output end of the propeller shaft 40 is connected to a differential gear 50. The output shafts of the differential gear 50 are connected to vehicle wheels 70.

The operational state of the vehicle 100 is detected by various sensors. For example, a crank angle sensor 300 detects engine speed NE, an intake air amount sensor 310 detects intake air amount GA, a throttle opening degree sensor 320 detects a throttle opening degree TA, which is the opening degree of the throttle valve 12. Further, a vehicle speed sensor 340 detects vehicle speed SP, an accelerator pedal sensor 350 detects accelerator pedal depression amount ACCP, which is the amount of depression of the accelerator pedal, an acceleration sensor 360 detects actual acceleration G of the vehicle 100 along the front-rear direction (longitudinal direction). The acceleration sensor 360 forms an acceleration detection section.

Signals from the above listed sensors are sent to the control apparatus 200, which in turn executes, for example, shift control of the automatic transmission 30 based on the signals.

As one procedure of the shift control of the automatic transmission 30, the control apparatus 200 adjusts, in accordance with the engine power (output torque), hydraulic pressure supplied to hydraulically actuated portions, such as the clutch 30C and the brake 30B, which are actuated when the gear of the automatic transmission 30 is shifted. More specifically, an estimated output torque TE of the engine 10 is computed based on the engine speed NE and the engine load KL. In the present embodiment, the engine load KL is computed as the ratio of the current intake air amount GA to the intake air amount at the maximum load. The engine load KL may be computed based on the throttle opening degree TA, the accelerator pedal depression amount ACCP, or the fuel injection amount.

An input torque Tin transmitted from the engine 10 to the automatic transmission 30 is computed based on the estimated output torque TE and the transmission efficiency of the torque converter 20, and the hydraulic pressure supplied to the hydraulically actuated portions is adjusted based on the computed input torque Tin. For example, when the input torque Tin is great, the hydraulic pressure supplied to the hydraulically actuated portions is raised to prevent the hydraulically actuated portions from skidding. In contrast, when the input torque Tin is small, the hydraulic pressure supplied to the hydraulically actuated portions is lowered so that excessive hydraulic pressure is not supplied. Such hydraulic pressure control improves the fuel consumption and the durability of the automatic transmission 30.

Since the combustion state of air-fuel mixture in the engine 10 changes depending on the components of fuel used, the engine power also varies depending on the fuel components. As described above, in the case where changes in the fuel components will certainly be within expected ranges, programs for detecting the fuel components in accordance with the expected ranges are prepared, so that the influence of compositional differences of fuel on the engine power can be determined.

However, an unexpected fuel, for example, a newly developed fuel that did not exist when the programs were developed or a fuel that has deteriorated further than when the programs were developed, may possibly be used in the engine 10. In such cases, the use of an unknown fuel, that is, the use of an unexpected fuel, cannot be detected. Hence, the influence of compositional differences of fuel on the engine power cannot be accurately detected.

If the influence of compositional differences of fuel on the engine power cannot be accurately detected, the accuracy of the estimate for the input torque Tin is lowered when the hydraulic pressure control of the automatic transmission 30 is executed. This can lead to excessive or insufficient hydraulic pressure supplied to the hydraulically actuated portions in relation to the input torque Tin.

Accordingly, a fuel diagnosis process shown below is executed in the present embodiment to detect the usage state for an unexpected fuel. Based on the result of the diagnosis, a correction process of the input torque Tin is executed to eliminate the above described drawbacks.

(Regarding Fuel Diagnosis Process)

Figure 2:
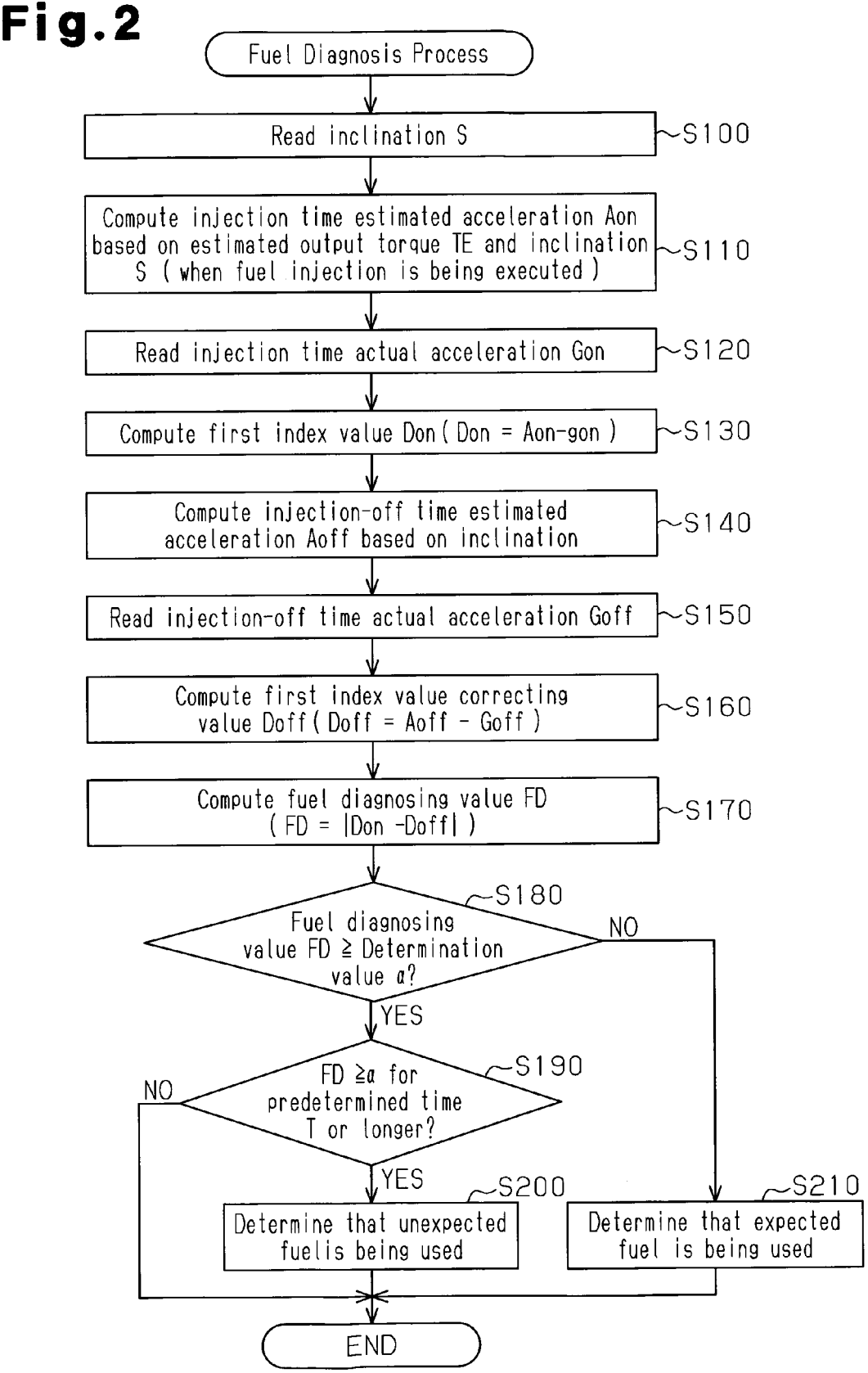
FIG. 2 is a flowchart showing a fuel diagnosis process executed by the control apparatus shown in FIG. 1.

FIG. 2 shows the fuel diagnosis process. The process is executed by the control apparatus 200. The control apparatus 200 functions as an inclination detecting section, a first estimating section (injection time acceleration estimating section), a second estimating section (injection-off time acceleration estimating section), and a diagnosing section.

When the process is started, the inclination S of the road on which the vehicle 100 is currently traveling is read (S100). The inclination S is a value that is computed in an inclination determining process executed separately from this process, for example, in the following manner.

Figure 3:
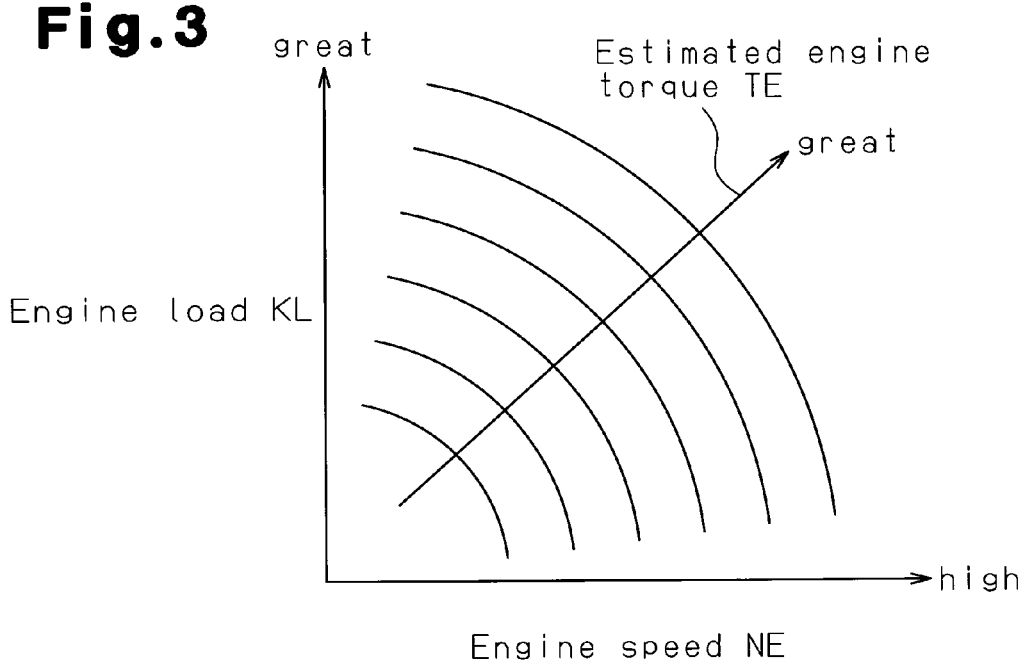
FIG. 3 is a schematic diagram showing the relationship between estimated output torque with engine speed and load.

First, as shown in FIG. 3, the estimated output torque TE of the engine 10 is computed based on the engine speed NE and the engine load KL. The estimated output torque TE computed at this time is a value that is estimated on the assumption that a previously expected fuel is being used in the engine 10.

A reference acceleration Gb, which is an acceleration that should be obtained if the vehicle 100 is traveling on a flat road surface, or a road surface where the inclination S is substantially zero, is computed based on the estimated output torque TE and the travel resistance of the vehicle 100. Then, the actual acceleration G is subtracted from the reference acceleration Gb to obtain the difference ΔG, based on which the inclination S is computed. More specifically, the greater the absolute value of the difference ΔG, the greater the value of the inclination S becomes. When the difference ΔG has a positive value, it is determined that the vehicle 100 is climbing (uphill). When the difference ΔG has a negative value, it is determined that the vehicle 100 is moving down (downhill). The inclination determining process corresponds to a process executed by the inclination detecting section.

Then, an injection time estimated acceleration (first estimated acceleration) Aon is computed (S110). The injection time estimated acceleration Aon is an estimated acceleration of the vehicle 100 that should be detected when fuel injection is being executed in the engine 10 while the vehicle 100 is traveling uphill. The injection time estimated acceleration Aon is computed based on the estimated output torque TE and the inclination S detected in the inclination determining process. The injection time acceleration Aon is computed when the accelerator pedal depression amount ACCP is greater than zero, that is, when the accelerator pedal is depressed, and the fuel injection is being executed in the engine 10. Step S110 corresponds to a process executed by the first estimating section.

Next, the actual acceleration G, which is detected when the injection time estimated acceleration Aon is computed, is read as an injection time actual acceleration Gon (s120), and a first index value Don is computed (S130) as a first deviation degree that shows the degree of deviation between the injection time estimated acceleration Aon and the injection time actual acceleration Gon. The first index value Don is a value obtained by subtracting the injection time actual acceleration Gon from the injection time estimated acceleration Aon, and computed for the reasons shown below.

As described above, the engine power, more specifically, the output torque, changes according to the fuel components.

Also, the actual output torque is closely related to the actual acceleration G when the vehicle 100 is traveling uphill. That is, the greater the actual output, the greater the actual acceleration G of the vehicle 100 becomes. Accordingly, based on the detected inclination S and the estimated output torque TE, which should be obtained when an expected fuel is being used, the injection time estimated acceleration Aon is computed, which is an acceleration of the vehicle 100 that should be obtained when fuel injection is being executed on a road surface having the inclination S computed in the inclination determining process, that is, when the vehicle 100 is traveling while an output torque is being generated. Then, the first index value Don is computed, which indicates the degree of deviation between the injection time actual acceleration Gon, which is detected when the injection time estimated acceleration Aon is computed, and the injection time estimated acceleration Aon. The injection time actual acceleration Gon is a value that changes in accordance with the actual output torque, and the injection time estimated acceleration Aon is computed based on the estimated output torque TE, which is computed on the assumption that a previously expected fuel is being used. Therefore, the first index value Don, which indicates the degree of deviation between the injection time actual acceleration Gon and the injection time estimated acceleration Aon of the vehicle 100, also serves as an index value indicating the difference between the estimated output torque and the actual output torque. The first index value Don reflects changes in the actual output torque caused by the use of an unexpected fuel. Therefore, the usage state of the unexpected fuel can be diagnosed based on the first index value Don.

When an unexpected fuel is being used and the actual output torque is greater than the estimated output torque TE, the injection time actual acceleration Gon is greater than the injection time estimated acceleration Aon. The first index value Don thus has a negative value. In contrast, when the use of an unexpected fuel causes the actual output torque to be smaller than the estimated output torque TE, the injection time actual acceleration Gon is smaller than the injection time estimated acceleration Aon. The first index value Don thus has a positive value. The higher the blend ratio of the unexpected fuel to the engine fuel, the more the injection time actual acceleration Gon of the vehicle 100 deviates from the injection time estimated acceleration Aon. Accordingly, the absolute value of the first index value Don is increased. When a previously expected fuel is being used, the first index value Don is basically zero. However, in reality, the first index value Don is a value close to zero because of, for example, estimation errors of the injection time estimated acceleration Aon and detection errors of the actual acceleration G.

Then, an injection-off time estimated acceleration (second estimated acceleration) Aoff is computed (S140). The injection-off time estimated acceleration Aoff is an estimated acceleration of the vehicle 100 that should be obtained if the fuel injection is not executed in the engine 10 when the vehicle 100 is traveling uphill, that is, if fuel cutoff is being performed. The injection-off time estimated acceleration Aoff is computed based on the detected inclination S. The injection-off time estimated acceleration Aoff is computed when the accelerator pedal depression amount ACCP is zero, that is, when the accelerator pedal is not depressed, the engine speed NE is in a deceleration time fuel cutoff execution region, and accordingly it is determined that the fuel injection of the engine 10 is off. Step S140 corresponds to a process executed by the second estimating section.

Next, the actual acceleration G, which is detected when the injection-off time estimated acceleration Aoff is computed, is read as an injection-off time actual acceleration Goff (s150), and a first index value correcting value Doff is computed (S160) that shows the degree of deviation between the injection-off time estimated acceleration Aoff and the injection off time actual acceleration Goff. The first index value correcting value Doff is a value obtained by subtracting the injection-off time actual acceleration Goff from the injection-off time estimated acceleration Aoff.

Next, the absolute value of a value obtained by subtracting the first index value correcting value Doff from the first index value Don is computed as a fuel diagnosing value FD (S170). The fuel diagnosing value FD is computed for the following reasons.

The injection-off time estimated acceleration Aoff is computed based on the inclination S that is detected when fuel injection is off. Thus, the value of the injection-off time estimated acceleration Aoff does not include an acceleration estimate based on the estimated output torque TE or estimation errors of the estimated acceleration. The value of the injection-off time estimated acceleration Aoff only includes an acceleration estimate based on the inclination S and estimation errors of the estimated acceleration.

The first index value correcting value Doff is computed as a value that indicates the difference between the injection-off time estimated acceleration Aoff and the injection-off time actual acceleration Goff. Thus, the first index value correcting value Doff includes error components such as estimation errors caused when the acceleration of the vehicle 100 is estimated based on the inclination S and detection errors caused when the actual acceleration is detected. Therefore, by correcting the first index value Don based on the first index value correcting value Doff, the above described error components are removed from the corrected first index value Don. As a result, the first index value Don, which has been corrected based on the first index value correcting value Doff, only includes the difference between the estimated output torque TE and the actual output torque. Therefore, in the present embodiment, the first index value correcting value Doff is subtracted from the first index value Don, so that the first index value Don is corrected by the first index value correcting value Doff, and the absolute value of the corrected the first index value Don is set as the fuel diagnosing value FD. The thus computed fuel diagnosing value FD accurately reflects changes in the actual output torque caused by the use of an unexpected fuel. The diagnosis of the usage state of the unexpected fuel based on the fuel diagnosing value FD improves the accuracy of the diagnosis of the usage state of the unexpected fuel.

Then, it is determined whether the fuel diagnosing value FD, which is computed in the above described manner, is greater than or equal to a predetermined determination value α (S180). If the fuel diagnosing value FD is less than the determination value α (S180: NO), it is determined that unexpected fuel is not being used, in other words, that an expected fuel is being used (S210). The current process is the ended.

When the fuel diagnosing value FD is greater than or equal to the determination value α (S180: YES), it is possible to determine that an unexpected fuel is being used. However, there is a possibility that the fuel diagnosing value FD is temporarily greater than or equal to the determination value α. Thus, in the subsequent step S190, whether the fuel diagnosing value FD has been greater than or equal to the determination value α for a predetermined time T or longer is determined (S190). If the fuel diagnosing value FD has been greater than or equal to the determination value α only for a period shorter than the predetermined period T, the current process is ended.

If the fuel diagnosing value FD has been greater than or equal to the determination value α for the predetermined period T or longer, it is determined that an unexpected fuel is being used (S200), and the current process is ended.

By executing the fuel diagnosis process, the usage state of an unexpected fuel, more specifically, whether an unexpected fuel is being used, is reliably diagnosed. When executing the fuel diagnosis process, the control apparatus 200 functions as the diagnosing section.

(Regarding Correction Process of Input Torque)

Figure 4:
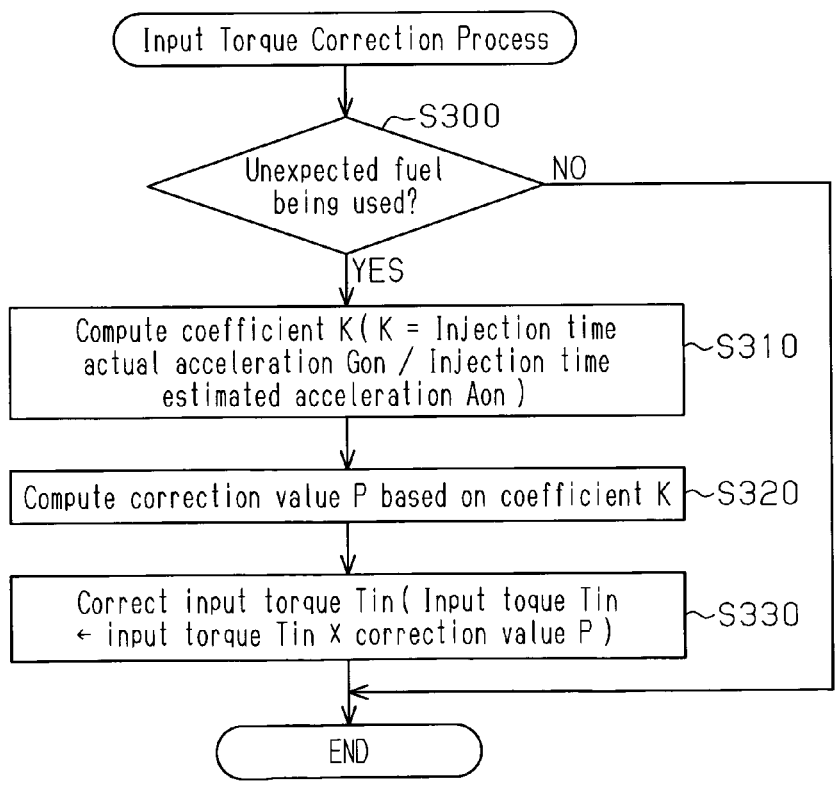
FIG. 4 is a flowchart showing an input torque correction process executed by the control apparatus shown in FIG. 1.

A correction process of the input torque Tin will now be described with reference to FIG. 4. This process is also executed by the control apparatus 200.

When this process is started, it is determined whether it has been determined, through the fuel diagnosis process, that an unexpected fuel is being used (S300). If it has been determined that an unexpected fuel is not being used (S300: NO), the current process is ended.

When it has been determined that an unexpected fuel is being used (S300: YES), a coefficient K is computed based on the following expression (1) at S310.

$$\text{Coefficient } K = \text{Injection time actual acceleration } Gon / \text{Injection time estimated acceleration } Aon \quad (1)$$

As described above, the injection time actual acceleration Gon is a value that correlates with the actual output torque, and the injection time estimated acceleration Aon is a value that correlates with the estimated output torque TE, which is computed on the assumption that an expected fuel is being used. Therefore, the coefficient K obtained from the expression (1) has a value of 1 when the actual output torque is equal to the estimated output torque TE, that is, when an expected fuel, which is a reference fuel, is being used. When the actual output torque is greater than the estimated output torque TE, the coefficient K has a value greater than 1. When the actual output torque is smaller than the estimated output torque TE, the coefficient K has a value less than 1. In this manner, the coefficient K is a value that indicates increase and decrease of the output torque caused by changes of fuel components. As obvious from the expression (1), the coefficient K is computed as the first deviation degree that indicates the degree of deviation between the injection time estimated acceleration Aon and the injection time actual acceleration Gon.

Figure 5:
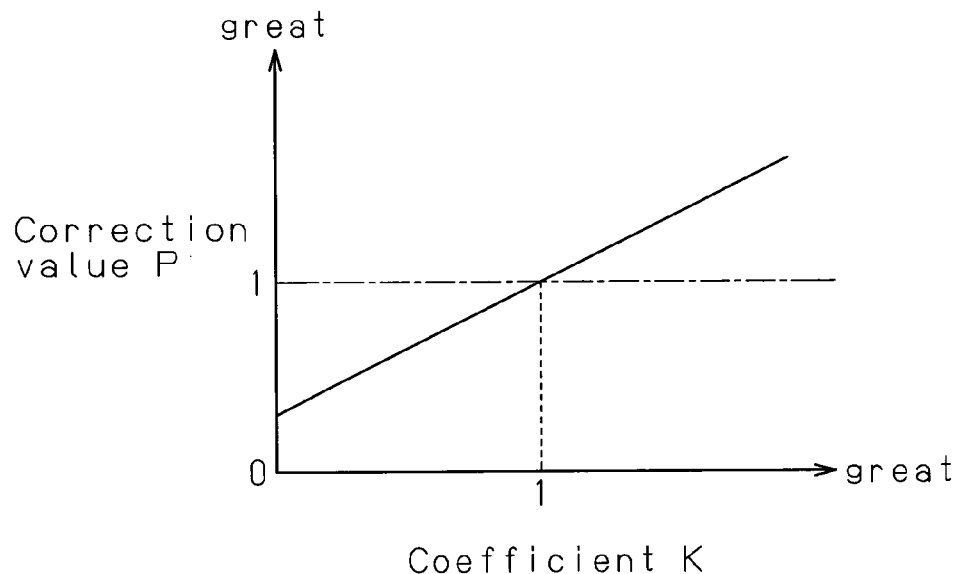
FIG. 5 is a graph showing the relationship between a correction value for the input torque and a coefficient.

Next, a correction value P for correcting the input torque Tin is set based on the coefficient K (S320). The greater the coefficient K, the greater the correction value P is set to be. More specifically, when the coefficient K has a value of 1 as shown in FIG. 5, the actual output torque is equal to the estimated output torque TE. In this case, the correction value P is set to 1. When the coefficient K is less than 1, the actual output torque is less than the estimated output torque TE. In this case, as the coefficient K becomes less than 1, the correction value P becomes less than 1. When the coefficient K is greater than 1, the actual output torque is greater than the estimated output torque TE. In this case, as the coefficient K becomes greater than 1, the correction value P becomes greater than 1.

Then, the input torque Tin is corrected by being multiplied by the correction value P (S330), and the current process is ended.

The correction of the input torque improves the estimation accuracy of the input torque Tin even if an unexpected fuel is being used. Thus, the control of hydraulic pressure supplied to hydraulically actuated portions of the automatic transmission 30 is properly performed.

The present embodiment provides the following advantages.

(1) The injection time estimated acceleration Aon, which is a vehicle acceleration obtained when fuel injection is being performed in the engine 10 while the vehicle 100 is traveling uphill or downhill, is computed based on the detected inclination S and the estimated output torque TE, which is computed based on the engine operation state on the assumption that a previously expected fuel is being used. Then, the first index value Don, which is the first deviation degree, is computed. The first deviation degree indicates the degree of deviation between the injection time estimated acceleration Aon and the injection time actual acceleration Gon, which is the actual acceleration G of the vehicle 100 when the injection time estimated acceleration Aon is computed. The first index value Don is an index value that indicates the difference between the estimated output torque TE and the actual output torque, and reflects changes in the engine power caused by the use of an unexpected fuel. Thus, the control apparatus 200 of the present embodiment diagnoses the usage state of the unexpected fuel based on the first index value Don, and is therefore capable of diagnosing the usage state of a fuel other than an expected fuel, that is, the usage state of an unexpected fuel.

(2) The injection-off time estimated acceleration Aoff, which is the vehicle acceleration when fuel injection is off in the engine 10 when the vehicle 100 is traveling uphill or downhill, is computed based on the inclination S of the road surface. Then, the first index value correcting value Doff, which is a second deviation degree, is computed. The second deviation degree indicates the degree of deviation between the injection-off time estimated acceleration Aoff and the injection-off time actual acceleration Goff, which is the actual acceleration G of the vehicle 100 when the injection-off time estimated acceleration Aoff is computed. This eliminates various error components from the first index value Don. The corrected first index value Don then only includes the difference between the estimated output torque TE and the actual output torque. Since the diagnosis of the usage state of an unexpected fuel is executed based on the corrected first index value Don (the fuel diagnosing value FD), the diagnosis accuracy of the usage state of an unexpected fuel is improved.

(3) As a specific method for diagnosing the usage state of an unexpected fuel, it is determined that an unexpected fuel is being used when the fuel diagnosing value FD is greater than or equal to the predetermined determination value α. This allows the use of an unexpected fuel to be diagnosed.

(4) The input torque Tin transmitted from the engine 10 to the automatic transmission 30 is computed based on the estimated output torque TE, and the hydraulic pressure supplied to the hydraulically actuated portions is adjusted based on the computed input torque Tin. The control apparatus 200 of the automatic transmission 30 computes the coefficient K as the first deviation degree that indicates the degree of deviation between the injection time actual acceleration Gon and the injection time estimated acceleration Aon. The control apparatus 200 corrects the input torque Tin using the correction value P, which is set based on the coefficient K. The estimation accuracy of the input torque Tin is improved even if an unexpected fuel is being used. Thus, the hydraulic pressure supplied to the hydraulically actuated portions of the automatic transmission 30 is properly controlled.

The above embodiment may be modified as follows.

Figure 6:
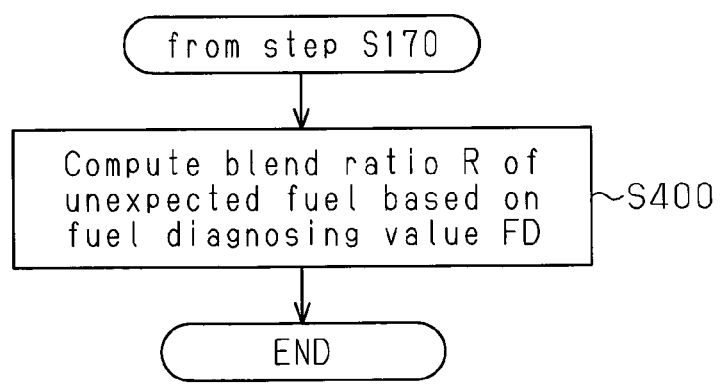
FIG. 6 is a flowchart showing a part of a fuel diagnosis process of a modification in accordance with the present invention.
Figure 7:
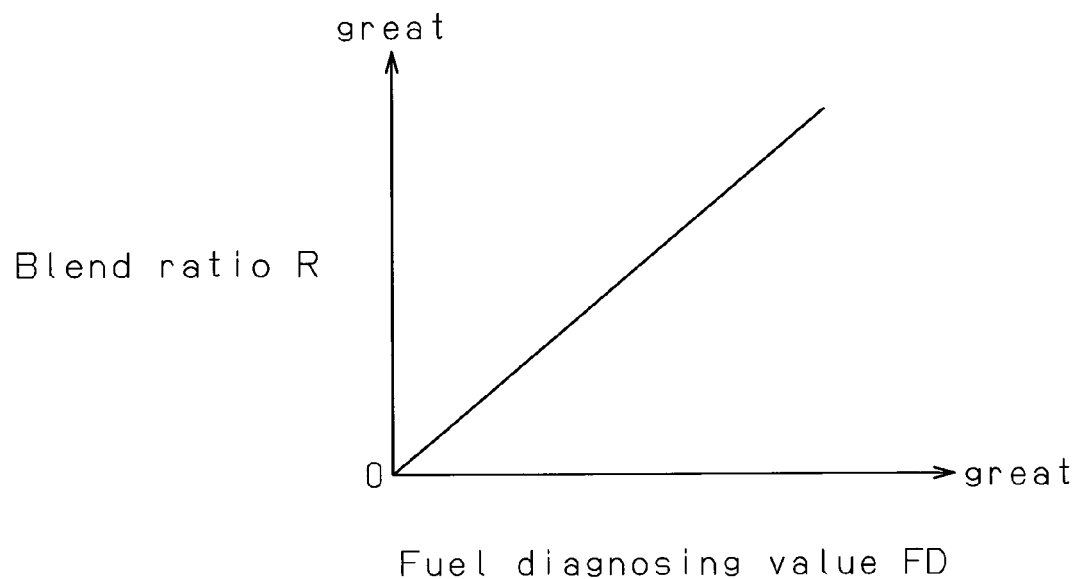
FIG. 7 is a graph showing the relationship between a fuel diagnosis value and a blend ratio according to the modification of FIG. 6.

The present invention is not limited to the above method for diagnosing the usage state of an unexpected fuel, in which the diagnosis is performed for whether or not an unexpected fuel is being used. As described above, the higher the blend ratio of the unexpected fuel to the engine fuel, the more the injection time actual acceleration Gon of the vehicle 100 deviates from the injection time estimated acceleration Aon. Accordingly, the absolute value of the first index value Don is increased. In view of this, as a specific method for diagnosing the usage state of unexpected fuel, a blend ratio R of an unexpected fuel may be computed. In this case, step S180 and the following steps in the fuel diagnosis process shown in FIG. 2 are replaced by step S400 shown in FIG. 6, in which the blend ratio R is computed based on the fuel diagnosing value FD, so that the blend ratio of an unexpected fuel can be computed. In step S300, the blend ratio R is computed such that the greater the fuel diagnosing value FD, the greater the blend ratio R becomes as shown in FIG. 7.

Figure 8:
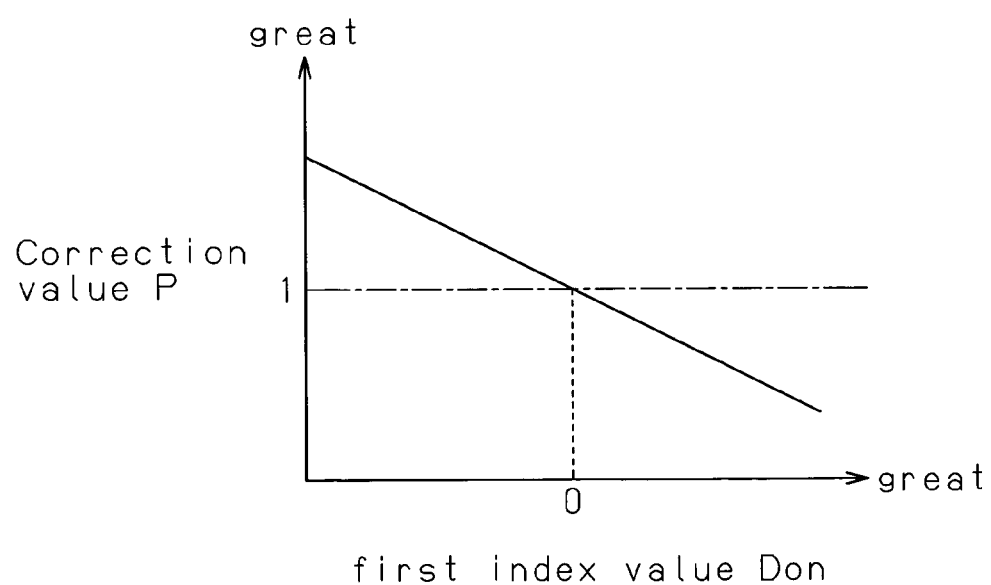
FIG. 8 is a graph showing the relationship between a coefficient and a correction value for the input torque.

In the above described correction process of the input torque, the coefficient K is computed as the first deviation degree, which indicates the degree of deviation between the injection time estimated acceleration Aon and the injection time actual acceleration Gon. However, in place of the coefficient K, the first index value Don (Don=injection time estimated acceleration Aon−injection time actual acceleration Gon) may be used as the first deviation degree. In this case, when the first index value Don has a value of 0 as shown in FIG. 8 (injection time estimated acceleration Aon=injection time actual acceleration Gon), the actual output torque is equal to the estimated output torque TE. In this case, the correction value P is set to 1.

When the first index value Don is less than 0 (injection time estimated acceleration Aon<injection time actual acceleration Gon), the actual output torque is greater than the estimated output torque TE. In this case, as the first index value Don becomes less than 0, the correction value P becomes greater than 1. Accordingly, the input torque Tin, which is computed based on the estimated output torque TE, is corrected to be increased to a value that corresponds to the actual output torque.

When the first index value Don is greater than 0 (injection time estimated acceleration Aon>injection time actual acceleration Gon), the actual output torque is smaller than the estimated output torque TE. In this case, as the first index value Don becomes greater than 0, the correction value P becomes less than 1. Accordingly, the input torque Tin, which is computed based on the estimated output torque TE, is corrected to be decreased to a value that corresponds to the actual output torque.

Based on a similar technical idea, the correction value P may be computed based on a value obtained by correcting the first index value Don with the first index value correcting value Doff, for example, a value obtained by subtracting the first index value correcting value Doff from the first index value Don. In this case, compared to a case where the correction value P is computed using the first index value Don without correction, the estimation accuracy of the input torque Tin is improved.

The coefficient K may be computed based on the following expression (2).

Coefficient $K$=first index value $Don$/first index value correcting value $Doff$     (2)

In this case also, the coefficient K varies in accordance with the first index value Don (Don=injection time estimated acceleration Aon−injection time actual acceleration Gon). Thus, a correction value for the input torque Tin can be obtained based on the coefficient K. Specifically, when the actual output torque is equal to the estimated output torque TE (injection time estimated acceleration Aon=injection time actual acceleration Gon), the first index value Don is 0, and the coefficient K is 0. In this case, the correction value is set to 1.

When the actual output torque is greater than the estimated output torque TE (the injection time actual acceleration Gon>the injection time estimated acceleration Aon), the first index value Don is less than 0, and the coefficient K has a negative value. In this case, the absolute value of the coefficient K increases in accordance with the degree of deviation between the estimated output torque TE and the actual output torque. Therefore, when the coefficient K has a negative value, a correction value that is greater than 1 is set, so that the estimated output torque TE is increased in accordance with the magnitude of the absolute value.

When the actual output torque is smaller than the estimated output torque TE (the injection time actual acceleration Gon<the injection time estimated acceleration Aon), the first index value Don is greater than 0, and the coefficient K has a positive value. In this case, the absolute value of the coefficient K increases in accordance with the degree of deviation between the estimated output torque TE and the actual output torque. Therefore, when the coefficient K has a positive value, a correction value that is less than 1 is set, so that the estimated output torque TE is decreased in accordance with the magnitude of the absolute value.

In the above described correction process of the input torque, a correction value is computed based the coefficient K, which is computed as the first deviation degree indicating the degree of deviation between the injection time estimated acceleration Aon and the injection time actual acceleration Gon. The input torque Tn is directly corrected using the obtained correction value. Alternatively, the estimated output torque TE may be corrected by a correction value computed based on the coefficient K, so that the input torque Tin is consequently corrected.

At least a change in the engine power caused by the use of an unexpected fuel is reflected in the first index value Don. Therefore, in the above embodiments, the first index value Don is corrected by the first index value correcting value Doff. However, such correction may be omitted to simplify the process. In this modification, steps S140 to S160 are omitted, and the absolute value of the first index value Don is set as the fuel diagnosing value FD in step S170. In this case also, the usage state of an unexpected fuel can be diagnosed.

In the above embodiments, the first index value Don and the first index value correcting value Doff are computed as the results of subtraction, but may be computed as the results of division.

In the above embodiments, whether fuel injection is being performed is determined based on the accelerator pedal depression amount ACCP, but may be determined based on another value such as the value of an injection command sent to the fuel injection valve 13.

The inclination detecting section of the above embodiments estimates the inclination S based on the difference ΔG, which is obtained by subtracting the actual acceleration G of the vehicle 100 from the reference acceleration Gb. However, such estimation of the inclination S is only one example. That is, the inclination S may be estimated in a different manner. Alternatively, instead of estimating the inclination S, the inclination S may be actually detected using, for example, an angle sensor.

The automatic transmission 30 is a transmission that includes the brake 30B and the clutch 30C, which are hydraulically actuated portions. However, the present invention may be used in other types of transmission. For example, the present invention may be applied to a continuously variable transmission, which has two pulleys and a belt wound about the pulleys. The effective diameter of each pulley is hydraulically changed, so that the gear ratio is continuously changed. Since the hydraulic pressure supplied to the pulleys of a continuously variable transmission is changed in accordance with the engine power, the use of the control apparatus according to the present invention allows the hydraulic pressure supplied to the pulleys to be properly controlled even if an unexpected fuel is being used.

The invention claimed is:

1. An engine fuel diagnosis device for diagnosing whether an unexpected fuel is being used in an internal combustion engine, the unexpected fuel being a fuel in which changes in fuel components go beyond an expected range, the device comprising:
    an inclination detecting section that, when a vehicle on which the internal combustion engine is mounted is traveling uphill or downhill, is configured to detect the inclination of the road surface;
    a first estimating section configured to compute a first estimated acceleration, which is a vehicle acceleration obtained when fuel injection is executed in the internal combustion engine while the vehicle is traveling uphill or downhill, based on an engine power, which is estimated based on the engine speed and the engine load on the assumption that a previously expected fuel is being used, and the inclination detected by the inclination detecting section;
    an acceleration detecting section configured to detect an actual acceleration, which is the actual acceleration of the vehicle;
    a diagnosing section configured to compute a first deviation degree indicating the degree of deviation between the first estimated acceleration and the actual acceleration detected when the first estimated acceleration is computed, and configured to diagnose a usage state of the unexpected fuel based on the first deviation degree; and
    a second estimating section configured to compute a second estimated acceleration based on the inclination detected by the inclination detecting section, the second estimated acceleration being a vehicle acceleration obtained when fuel injection is off in the internal combustion engine while the vehicle is traveling uphill or downhill,
    wherein the diagnosing section is configured to compute a second deviation degree indicating the degree of deviation between the second estimated acceleration and the actual acceleration detected when the second estimated acceleration is computed, and is configured to correct the first deviation degree based on the second deviation degree when diagnosing the usage state of the unexpected fuel.

2. The fuel diagnosis device according to claim 1, wherein the diagnosing section is configured to compute, as the usage state of the unexpected fuel, a blend ratio of the unexpected fuel to an engine fuel, such that the greater the first deviation degree, the higher the blend ratio is computed to be.

3. The fuel diagnosis device according to claim 1, wherein the diagnosing section is configured to determine, as the usage state of the unexpected fuel, whether the unexpected fuel is being used, the diagnosing section determining that the unexpected fuel is being used when the first deviation degree is greater than or equal to a predetermined determination value.

4. A control apparatus for an automatic transmission having a hydraulically actuated portion, the control apparatus estimating an input torque transmitted from an internal combustion engine mounted on a vehicle to the automatic transmission, and adjusting hydraulic pressure supplied to the hydraulically actuated portion based on the estimated input torque, the control apparatus comprising a fuel diagnosis device, for diagnosing whether an unexpected fuel is being used in the internal combustion engine, the unexpected fuel being a fuel in which changes in fuel components go beyond an expected range, the device comprising:

an inclination detecting section that, when the vehicle on which the internal combustion engine is mounted is traveling uphill or downhill, is configured to detect the inclination of the road surface;

a first estimating section configured to compute a first estimated acceleration, which is a vehicle acceleration obtained when fuel injection is executed in the internal combustion engine while the vehicle is traveling uphill or downhill, based on an engine power, which is estimated based on the engine speed and the engine load on the assumption that a previously expected fuel is being used, and the inclination detected by the inclination detecting section;

an acceleration detecting section configured to detect an actual acceleration, which is the actual acceleration of the vehicle;

a diagnosing section configured to compute a first deviation degree indicating the degree of deviation between the first estimated acceleration and the actual acceleration detected when the first estimated acceleration is computed, and configured to diagnose a usage state of the unexpected fuel based on the first deviation degree, and the control apparatus configured to correct the input torque based on the first deviation degree;

a second estimating section configured to compute a second estimated acceleration based on the inclination detected by the inclination detecting section, the second estimated acceleration being a vehicle acceleration obtained when fuel injection is off in the internal combustion engine while the vehicle is traveling uphill or downhill, wherein the diagnosing section is configured to compute a second deviation degree indicating the degree of deviation between the second estimated acceleration and the actual acceleration detected when the second estimated acceleration is computed, and is configured to correct the first deviation degree based on the second deviation degree when diagnosing the usage state of the unexpected fuel.

* * * * *